United States Patent
Onishi et al.

(10) Patent No.: US 7,101,529 B2
(45) Date of Patent: Sep. 5, 2006

(54) ALUMINUM HYDROXIDE AND PRODUCTION PROCESS THEREOF

(75) Inventors: Akira Onishi, Yokohama (JP); Shirou Tomitsuka, Yokohama (JP); Seisuke Takahashi, Yokohama (JP)

(73) Assignee: Showa Denko K.K., Tokyo (JP)

( * ) Notice: Subject to any disclaimer, the term of this patent is extended or adjusted under 35 U.S.C. 154(b) by 617 days.

(21) Appl. No.: 10/363,921

(22) PCT Filed: Jun. 21, 2002

(86) PCT No.: PCT/JP02/06201

§ 371 (c)(1),
(2), (4) Date: Mar. 10, 2003

(87) PCT Pub. No.: WO03/000803

PCT Pub. Date: Jan. 3, 2003

(65) Prior Publication Data

US 2004/0013604 A1   Jan. 22, 2004

Related U.S. Application Data

(60) Provisional application No. 60/300,857, filed on Jun. 27, 2001.

(30) Foreign Application Priority Data

Jun. 21, 2001  (JP) ............................. 2001-188813

(51) Int. Cl.
*C01F 7/02* (2006.01)
(52) U.S. Cl. .................. 423/629; 423/111; 524/437
(58) Field of Classification Search ............. 423/111, 423/127, 629; 524/437
See application file for complete search history.

(56) References Cited

U.S. PATENT DOCUMENTS 4,340,579 A    7/1982  Greber et al.
5,492,542 A *  2/1996  Brown et al. ............. 23/305 A
2003/0185747 A1* 10/2003 Onishi et al. ............. 423/629

FOREIGN PATENT DOCUMENTS

| EP | 0 407 595 A | 1/1991 |
|---|---|---|
| JP | 62-9256 B2 | 2/1987 |
| JP | 05-4336 B2 | 1/1993 |
| JP | 09-208740 A | 8/1997 |
| WO | WO 01 00529 A | 1/2001 |

OTHER PUBLICATIONS

Gerson A R et al., "Influence of Solution Constituents, Solution Conditioning and Seeding on the Crystalline Phase of Aluminum Hydroxide Using in Situ X-ray Diffraction", Mar. 1, 1996, Journal of Crystal Growth, North Holland Publishing Co., Amsterdam, NL, vol. 160, NR. 3, 4 pp. 346-354, XP002151672.
Database WPI, Section Ch, Week 199109, Derwent Publications Ltd., London, GB; AN 1991-060921, XP002216509.
Database WPI, Section Ch, Week 199737, Derwent Publications Ltd., London, GB; An 1997-399664, XP002151673.
International Search Report for PCT/JP02/06201 dated Oct. 24, 2002.

* cited by examiner

*Primary Examiner*—Stanley S. Silverman
*Assistant Examiner*—Timothy C. Vanoy
(74) *Attorney, Agent, or Firm*—Sughrue Mion, PLLC

(57) ABSTRACT

A method for producing aluminum hydroxide, comprises the steps of: elevating a temperature of a slurry having agglomerated secondary particles of aluminum hydroxide obtained through the Bayer's process suspended in a sodium aluminate solution from not more than 70° C. to not less than 85° C. within 15 minutes, thereby disintegrating the agglomerated secondary particles; and retaining, for a period of at least 15 minutes from temperature elevation, the temperature of the slurry so as not to be lowered to not less than 80° C.

8 Claims, No Drawings

ALUMINUM HYDROXIDE AND PRODUCTION PROCESS THEREOF

CROSS REFERENCE TO RELATED APPLICATIONS

This application is an application filed under 35 U.S.C. § 111(a) claiming the benefit pursuant to 35 U.S.C. § 119(e)(1) of the filing date of Provisional Application No. 60/300,857 filed Jun. 27, 2001 pursuant to 35 U.S.C. §111(b).

TECHNICAL FIELD

The present invention relates to aluminum hydroxide that is employed as flame-retardant filler or a similar material for use in plastics, rubber, etc., and to a method for producing the aluminum hydroxide. More particularly, the invention relates to aluminum hydroxide that has been disintegrated to thereby form separate, individual particles without causing unfavorable phenomena, such as roughening of particle surfaces and chipping of the particles, and to a method for producing the aluminum hydroxide.

BACKGROUND ART

Conventionally, aluminum hydroxide has been employed as filler for fulfilling various functions in rubber/plastics. For example, aluminum hydroxide is added, as a flame retardant, to thermoplastic resins, rubber or epoxy resins, and is added, as color-controlling filler, to thermosetting resins, such as unsaturated polyester resins and acrylic resins.

When aluminum hydroxide is employed as a flame retardant, flame retardation performance is enhanced as the amount of aluminum hydroxide is increased. However, addition of a large amount of aluminum hydroxide elevates the torque required for kneading and the molding temperature, thereby causing problematic foaming due to dehydration of a portion of aluminum hydroxide. When aluminum hydroxide is added to thermosetting resins, an increase in the amount of added aluminum hydroxide reduces material costs, but material strength problematically decreases.

In order to prevent decrease in material strength, particle size is desirably reduced to be as small as possible. Although aluminum hydroxide particles having a small particle size can be yielded through precipitation, addition of a large amount of such small particles serving as filler is difficult, since aluminum hydroxide forms agglomerated secondary particles, which are formed through agglomeration of a large number of primary particles, and exhibits considerably high absorption of oil. Accordingly, aluminum hydroxide particles having a particle size of approximately 50 to 150 μm are pulverized by means of a ball mill or other pulverizer to thereby form approximately primary particles, which are generally employed as filler.

However, pulverizing the particles to a predetermined particle size through a pulverization technique requires a large amount of energy. In addition, aluminum hydroxide primary particles yielded through pulverization are caused to break, thereby causing roughening of particle surfaces, chipping of the particles, etc. As a result, the BET specific surface area of the resultant powder increases. Thus, such powder has poor compatibility with resin and increases the viscosity of the resin containing the powder, failing to attain high-density incorporation of the powder. When the powder is added to a thermosetting resin, the curing time of the resin is prolonged.

On the basis of these tendencies, aluminum hydroxide ideal for serving as filler is thought to have a small surface roughness, i.e., a small BET specific surface area, and to form separate, individual particles.

JP-B HEI 5-4336 discloses a method for disintegrating agglomerated secondary particles by application of strong centrifugal force by means of a continuous centrifuge without breaking the corresponding primary particles, thereby preventing roughening of surfaces of the primary particles. However, the above method is limited to applications of a specific raw material. That is, the method cannot be applied to a wide range of materials.

JP-B SHO 62-9256 discloses a method for producing single-crystalline or roundish aluminum hydroxide particles by bringing a temperature-elevated Bayer extract into contact with solid aluminum hydroxide. However, the above method has drawbacks in that it requires a long period of contact time and that dissolution of aluminum hydroxide during contact is promoted, thereby deteriorating production efficiency.

JP-A HEI 9-208740 discloses a method for reducing the BET specific surface area of aluminum hydroxide particles by pulverizing in advance agglomerated aluminum hydroxide secondary particles by means of a dry-impact pulverizer, adding the pulverized product into a sodium aluminate solution having a predetermined alkaline concentration to thereby form a slurry, and elevating the temperature of the slurry to thereby dissolve the particle surfaces. However, the method also has a drawback in that aluminum hydroxide has to be filtered and dried in order to effect dry pulverization performed in advance, thereby prolonging production steps and elevating production costs.

Accordingly, an object of the present invention is to provide aluminum hydroxide ideal for serving as filler, the aluminum hydroxide having a small BET specific surface area over a wide particle size range and forming separate, individual particles.

Another object of the invention is to provide a method for effectively producing the aluminum hydroxide.

In view of the foregoing, the present inventors have carried out extensive studies in order to attain the above objects, and have found that ideal aluminum hydroxide having a small specific surface area suitable for serving as filler and forming separate, individual particles can be produced by elevating the temperature of a slurry under predetermined conditions, which slurry is yielded by suspending aluminum hydroxide in a specific sodium aluminate solution, and maintaining the slurry under predetermined conditions. The present invention has been accomplished on the basis of this finding.

DISCLOSURE OF THE INVENTION

Accordingly, the present invention provides a method for producing aluminum hydroxide, which comprises elevating, from 70° C. or lower to 85° C. or higher within 15 minutes, a temperature of a slurry of aluminum hydroxide suspended in a sodium aluminate solution, which aluminum hydroxide has been obtained through the Bayer's process, and then maintaining the temperature of the slurry, without being lowered to 80° C. or lower, for at least 15 minutes from temperature elevation initiation.

In the above method, the sodium aluminate solution has, before temperature elevation, a ratio A/C of an alumina concentration A g/liter to a sodium hydroxide concentration C g/liter of 0.45 or less.

In any one of the methods mentioned above, the aluminum hydroxide has a percent dissolution, due to temperature elevation of the slurry, of less than 15%, which percent dissolution is represented by:

Percent dissolution (%)=C (before temperature elevation)×{A/C (after temperature elevation)−A/C (before temperature elevation)}×1.53/slurry concentration (before temperature elevation)×100, wherein A represents the alumina concentration (g/liter) of the sodium aluminate solution and C represents the sodium hydroxide concentration (g/liter) of the sodium aluminate solution.

In the method just mentioned above, the temperature of the slurry is elevated by means of a double-tube heat exchanger serving as a temperature elevation apparatus.

The invention further provides aluminum hydroxide produced through any one the methods mentioned above, which has a mean particle size D of 1–25 μm; a BET specific surface area S of 1.5 $m^2/g$ or less; and a ratio $D/D_{bet}$ (agglomeration degree) of D to a particle size $D_{bet}$ of less than 3, the particle size $D_{bet}$ being a sphere-equivalent particle size calculated on the basis of $D_{bet}=6/(S\times\rho)$, wherein ρ represents the density of aluminum hydroxide.

The invention further provides an aluminum hydroxide composition comprising, as filler, the aluminum hydroxide just mentioned above.

The aluminum hydroxide composition just mentioned above comprises a matrix material of rubber or plastic.

As described above, by applying thermal impact to aluminum hydroxide and selectively affecting the grain boundary of the agglomerated secondary particles by crystallographically weak cohesive force, it is possible to obtain aluminum hydroxide having a small specific surface area and forming separate, individual particles, which is suitable for filler.

BEST MODE FOR CARRYING OUT THE INVENTION

The present invention will next be described in more detail.

The present invention provides a method for producing aluminum hydroxide, comprising elevating, from 70° C. or lower to 85° C. or higher within 15 minutes, the temperature of a slurry of aluminum hydroxide suspended in a sodium aluminate solution, in which aluminum hydroxide has been obtained through the Bayer's process, and the sodium aluminate solution has a ratio A/C of an alumina ($Al_2O_3$) concentration A g/liter to a sodium hydroxide (NaOH) concentration C g/liter of 0.45 or less; and then maintaining the temperature of the slurry, without being lowered to 80° C. or lower, for at least 15 minutes from temperature elevation initiation. The aluminum hydroxide produced through this method can be suitably employed as filler.

In the above-described production method, disintegrating of agglomerated secondary particles of aluminum hydroxide is performed by applying thermal impact to aluminum hydroxide; selectively affecting the grain boundary of the agglomerated secondary particles by crystallographically weak cohesive force; and preventing such variation in particle size as resulting from re-agglomeration occurring after dissolution.

The above method can provide aluminum hydroxide having a mean particle size D of 1–25 μm; a specific surface area S, as measured through a nitrogen absorption method (BET method), of 1.5 $m^2/g$ or less; and a ratio $D/D_{bet}$ (agglomeration degree) of D to a particle size $D_{bet}$ of less than 3, the particle size $D_{bet}$ being a sphere-equivalent particle size calculated from S, i.e., $D_{bet}=6/(S\times\rho)$, wherein ρ represents the density of aluminum hydroxide.

In the present method, temperature elevation to at least 85° C. must be performed. When the temperature is lower than 85° C., thermal impact required for selectively affecting the grain boundary cannot be provided, and therefore such a low temperature is not preferred, since dissolution of particles progresses from the surfaces of the particles, thereby deteriorating production efficiency, and the particle surfaces are roughened.

Although the boiling point of a sodium aluminate solution is not constant and varies depending on the sodium hydroxide concentration thereof, a sodium aluminate solution employed in a step of the Bayer's process has a boiling point of approximately 104° C.

The period of time for carrying out temperature elevation in the present method is 15 minutes or shorter. Periods of time of longer than 15 minutes are not preferred, since thermal impact required for selectively affecting the grain boundary cannot be provided, and the entirety of the particles is dissolved.

The temperature of the slurry before being subjected to temperature elevation in the present method is 70° C. or lower, preferably 65° C. or lower. Slurry temperatures of higher than 70° C. are not preferred, since thermal impact required for selectively affecting the grain boundary cannot be provided in the course of temperature elevation.

In the present invention, the temperature at which the slurry is maintained after completion of temperature elevation is 80° C. or higher, preferably 85° C. or higher. Maintenance temperatures of lower than 80° C. are not preferred, since disintegrated particles agglomerate again.

The sodium aluminate solution employed in the present method has, before temperature elevation, a ratio A/C of an alumina concentration A g/liter to a sodium hydroxide concentration C g/liter of 0.45 or less, preferably 0.40 or less. The A/C ratio higher than 0.45 is not preferred, since the alumina component cannot be dissolved in an amount required for affecting the grain boundary through temperature elevation.

The percent dissolution of aluminum hydroxide due to temperature elevation in the present method is less than 15%, preferably less than 13%. When the percent dissolution is more than 15%, yield of aluminum hydroxide decreases, thereby deteriorating production efficiency.

The percent dissolution of aluminum hydroxide due to temperature elevation is calculated on the basis of the following formula:

Percent dissolution (%)=C (before temperature elevation)×{A/C (after temperature elevation)−A/C (before temperature elevation)}×1.53/slurry concentration (before temperature elevation)×100, wherein A represents the alumina concentration (g/liter) of the sodium aluminate solution and C represents the sodium hydroxide concentration (g/liter) of the sodium aluminate solution.

In the present invention, aluminum hydroxide for resin filler having a small BET specific surface area at a desired particle size and forming separate, individual particles can be produced by selecting the primary particle size of agglomerated secondary particles serving as raw material in consideration of the desired particle size realized through dissolution.

The aluminum hydroxide produced according to the present invention is suitably employed as filler for fulfilling various functions. Examples of preferably used matrix material to which a composition containing aluminum hydroxide serving as filler is added include rubber and plastics, such as thermoplastic resins, epoxy resins and thermosetting resins (e.g., unsaturated polyester resins and acrylic resins).

When added to a resin or a similar material, the aluminum hydroxide produced according to the present method may be used singly or in combination of several types of aluminum hydroxide particles having different particle sizes so as to reduce the compound viscosity.

The aluminum hydroxide produced according to the present method may be treated with a conventionally known surface-treating agent. No particular limitation is imposed on the surface-treating agent, and examples thereof include coupling agents; such as silane coupling agents and titanate coupling agents; fatty acids, such as oleic acid and stearic acid; esters thereof; and silicates, such as methyl silicate and ethyl silicate.

The present invention will next be described in more detail using examples, which should not be construed as limiting the invention thereto. In the present invention, physical properties were measured through the following methods.

The mean particle size D of aluminum hydroxide was measured through a laser scattering diffraction method.

The specific surface area S of aluminum hydroxide was measured through a nitrogen absorption method (BET method).

The agglomeration degree of aluminum hydroxide was estimated on the basis of the ratio $D/D_{bet}$ of D to the particle size $D_{bet}$, which is a sphere-equivalent particle size calculated on the basis of $D_{bet}=6/(S\times\rho)$, wherein $\rho$ represents the density of aluminum hydroxide.

The percent dissolution of aluminum hydroxide due to temperature elevation is calculated on the basis of the following formula:

Percent dissolution (%)=C (before temperature elevation)×{A/C (after temperature elevation)−A/C (before temperature elevation)}×1.53/slurry concentration (before temperature elevation)×100, wherein A represents the alumina concentration (g/liter) of the sodium aluminate solution and C represents the sodium hydroxide concentration (g/liter) of the sodium aluminate solution.

EXAMPLE 1

A slurry of aluminum hydroxide which had been produced through the Bayer's process (mean particle size of aluminum hydroxide: 110.9 μm, sodium hydroxide concentration: 149 g/liter, A/C=0.37, slurry concentration: 175 g/liter, and slurry temperature: 38° C.) was fed to the inner tube of a double-tube heat exchanger (inner tube capacity: 0.019 m³, heat transfer area: 3.2 m²) at 3 m³/hr (residence time in the heat exchanger: 23 seconds). By feeding steam to the outer tube of the heat exchanger, the temperature of the slurry was elevated to 96° C., followed by maintaining the slurry at 85° C. for 15 minutes. The A/C and percent dissolution of the slurry were found to be 0.46 and 11.7%, respectively.

Solid aluminum hydroxide was removed from the slurry, followed by washing, separating through filtration and drying. The thus-yielded aluminum hydroxide was found to have a mean particle size D of 22.2 μm, a BET specific surface area S of 0.2 m²/g and an agglomeration degree of 1.8.

EXAMPLE 2

An aluminum hydroxide slurry similar to that employed in Example 1 was placed in a SUS tank (capacity 1 m³), and the tank temperature was elevated to 85° C. over 15 minutes under stirring. The A/C and percent dissolution of the slurry were found to be 0.48 and 14.3%, respectively. Solid aluminum hydroxide was removed from the slurry, followed by washing, separating through filtration and drying. The thus-yielded aluminum hydroxide was found to have a mean particle size D of 21.6 μm, a BET specific surface area S of 0.3 m²/g and an agglomeration degree of 2.6.

EXAMPLE 3

A slurry of aluminum hydroxide which had been produced through the Bayer's process (mean particle size of aluminum hydroxide: 76.8 μm, sodium hydroxide concentration: 146 g/liter, A/C=0.38, slurry concentration: 190 g/liter, and slurry temperature: 65° C.) was placed in a SUS tank similar to that employed in Example 2, and the tank temperature was elevated to 85° C. over 15 minutes under stirring. The A/C and percent dissolution of the slurry were found to be 0.48 and 11.8%, respectively. Solid aluminum hydroxide was removed from the slurry, followed by washing, separating through filtration and drying. The thus-yielded aluminum hydroxide was found to have a mean particle size D of 13.4 μm, a BET specific surface area S of 0.3 m²/g and an agglomeration degree of 1.6.

EXAMPLE 4

A slurry of aluminum hydroxide which had been produced through the Bayer's process (mean particle size of aluminum hydroxide: 20.8 μm, sodium hydroxide concentration: 154 g/liter, A/C=0.35, slurry concentration: 230 g/liter, and slurry temperature: 64° C.) was placed in a SUS tank similar to that employed in Example 2, and the tank temperature was elevated to 85° C. over 15 minutes under stirring. The A/C and percent dissolution of the slurry were found to be 0.49 and 14.3%, respectively. Solid aluminum hydroxide was removed from the slurry, followed by washing, separating through filtration and drying. The thus-yielded aluminum hydroxide was found to have a mean particle size D of 2.9 μm, a BET specific surface area S of 1.2 m²/g and an agglomeration degree of 1.4.

COMPARATIVE EXAMPLE 1

An aluminum hydroxide slurry similar to that employed in Example 1 was placed in a SUS tank similar to that employed in Example 2, and the tank temperature was elevated to 80° C. over 15 minutes under stirring. The A/C and percent dissolution of the slurry were found to be 0.45 and 10.4%, respectively. Solid aluminum hydroxide was removed from the slurry, followed by washing, separating through filtration and drying. The thus-yielded aluminum hydroxide was found to have a mean particle size D of 46.5 μm, a BET specific surface area S of 0.2 m²/g and an agglomeration degree of 3.8.

COMPARATIVE EXAMPLE 2

An aluminum hydroxide slurry similar to that employed in Example 1 was placed in a SUS tank similar to that employed in Example 2, and the tank temperature was elevated to 85° C. over 30 minutes under stirring. The A/C and percent dissolution of the slurry were found to be 0.51 and 18.2%, respectively. Solid aluminum hydroxide was removed from the slurry, followed by washing, separating through filtration and drying. The thus-yielded aluminum hydroxide was found to have a mean particle size D of 25.4 μm, a BET specific surface area S of 0.2 m²/g and an agglomeration degree of 2.0.

COMPARATIVE EXAMPLE 3

A slurry of aluminum hydroxide which had been produced through the Bayer's process (mean particle size of aluminum hydroxide: 76.8 μm, sodium hydroxide concentration: 147 g/liter, A/C=0.47, slurry concentration: 210 g/liter, and slurry temperature: 63° C.) was placed in a SUS tank similar to that employed in Example 2, and the tank temperature was elevated to 85° C. over 15 minutes under stirring. The A/C and percent dissolution of the slurry were found to be 0.51 and 4.3%, respectively. Solid aluminum hydroxide was removed from the slurry, followed by washing, separating through filtration and drying. The thus-yielded aluminum hydroxide was found to have a mean particle size D of 35.5 μm, a BET specific surface area S of 0.2 m²/g and an agglomeration degree of 2.9.

The results of Examples 1 to 4 and Comparative Examples 1 to 3 are summarized in Table 1 below.

ing aluminum hydroxide of the present invention is an epoch-making method in that the primary particle surfaces are not roughened during the course of disintegrating. Thus, the aluminum hydroxide produced through the method of the invention is suitable for filler and is of remarkably great industrial value, since the aluminum hydroxide has a small specific surface area and forms separate, individual particles.

The invention claimed is:

1. A method for producing aluminum hydroxide, comprising the steps of:
   elevating a temperature of a slurry having agglomerated secondary particles of aluminum hydroxide obtained through the Bayer's process suspended in a sodium aluminate solution from not more than 70° C. to not less than 85° C. within 15 minutes, thereby disintegrating the agglomerated secondary particles; and
   retaining, for a period of at least 15 minutes from temperature elevation, the temperature of the slurry so as not to be lowered to not less than 80° C.

2. The method according to claim 1, wherein the sodium aluminate solution has, before temperature elevation, a ratio

TABLE 1

|  |  | Ex. 1 | Ex. 2 | Ex. 3 | Ex. 4 | Comp. Ex. 1 | Comp. Ex. 2 | Comp. Ex. 3 |
|---|---|---|---|---|---|---|---|---|
| Al hydroxide raw material characteristics |  |  |  |  |  |  |  |  |
| Mean particle size | μm | 110.9 | 110.9 | 76.8 | 20.8 | 110.9 | 110.9 | 76.8 |
| Na aluminate solution characteristics |  |  |  |  |  |  |  |  |
| NaOH concentration | g/L | 149 | 149 | 146 | 154 | 149 | 149 | 147 |
| A/C | — | 0.37 | 0.37 | 0.38 | 0.35 | 0.37 | 0.37 | 0.47 |
| Slurry characteristics |  |  |  |  |  |  |  |  |
| Slurry concentration | g/L | 175 | 175 | 190 | 230 | 175 | 175 | 210 |
| Slurry temperature | ° C. | 38 | 38 | 65 | 64 | 38 | 38 | 63 |
| Temp. elevation conditions |  |  |  |  |  |  |  |  |
| Temp. elevated | ° C. | 96 | 85 | 85 | 85 | 80 | 85 | 85 |
| Temp. elevation time |  | 23 sec | 15 min | 15 min | 15 min | 15 min | 30 min | 15 min |
| Temp. maintained | ° C. | 85 |  |  |  |  |  |  |
| Temp. maintenance time |  | 15 min |  |  |  |  |  |  |
| A/C (after temp. elevation) | — | 0.46 | 0.48 | 0.48 | 0.49 | 0.45 | 0.51 | 0.51 |
| Percent dissolution | % | 11.7 | 14.3 | 11.8 | 14.3 | 10.4 | 18.2 | 4.3 |
| Al hydroxide characteristics (after filtration) |  |  |  |  |  |  |  |  |
| Mean particle size D | μm | 22.2 | 21.6 | 13.4 | 2.9 | 46.5 | 25.4 | 35.5 |
| BET sp. surface area S | m²/g | 0.2 | 0.3 | 0.3 | 1.2 | 0.2 | 0.2 | 0.2 |
| Agglomeration degree | — | 1.8 | 2.6 | 1.6 | 1.4 | 3.8 | 2.0 | 2.9 |

INDUSTRIAL APPLICABILITY

According to the production method of the present invention, disintegrating of agglomerated secondary particles of aluminum hydroxide is performed by applying thermal impact to aluminum hydroxide; selectively affecting the grain boundary of the agglomerated secondary particles by crystallographically weak cohesive force; and preventing such variation in particle size as resulting from re-agglomeration occurring after dissolution.

Differing from conventionally employed pulverization methods making use of impact force generated by attrition of media, grinding methods making use of a mill, such as a Raymond mill, and pulverization methods making use of collision of particles (e.g., jet mill); the method for produc- A/C of an alumina concentration A g/liter to a sodium hydroxide concentration C g/liter of 0.45 or less.

3. The method according to claim 1, wherein the aluminum hydroxide has a percent dissolution, due to temperature elevation of the slurry, of less than 15%, which percent dissolution is represented by:

Percent dissolution (%)=C (before temperature solution)×{A/C (after temperature elevation)−A/C (before temperature elevation)}×1.53 slurry concentration (before temperature elevation)×100, wherein A represents the alumina concentration (g/liter) of the sodium aluminate solution and C represents the sodium hydroxide concentration (g/liter) of the sodium aluminate solution.

4. The method according to claim 3, wherein the temperature of the slurry is elevated by means of a double-tube heat exchanger serving as a temperature elevation apparatus.

5. Aluminum hydroxide produced through the method according to claim 1, which has a mean particle size D of 1–25 μm; a BET specific surface area S of 1.5 m$^2$/g or less; and a ratio D/D$_{bet}$ (agglomeration degree) of D to a particle size D$_{bet}$ of less than 3, the particle size D$_{bet}$ being a sphere-equivalent particle size calculated on the basis of D$_{bet}$=6/(S×ρ), wherein ρ represents the density of aluminum hydroxide.

6. An aluminum hydroxide composition comprising, as filler, the aluminum hydroxide according to claim 5.

7. The aluminum hydroxide composition according to claim 6, which comprises a matrix material of rubber or plastic.

8. Aluminum hydroxide having a mean particle size D of 1 to 25 μm, a BET specific surface area S of 1.5 m$^2$/g or less and a ratio (agglomeration degree) of the mean particle size D to a particle size D$_{bet}$, which ratio D/D$_{bet}$ is less than 3, wherein the particle size D$_{bet}$, is a sphere-equivalent particle size calculated on a basis of D$_{bet}$=6/(S×ρ) in wherein ρ represents a density of aluminum hydroxide.

* * * * *